United States Patent [19]
Inui et al.

[11] Patent Number: 5,645,978
[45] Date of Patent: Jul. 8, 1997

[54] METHOD FOR MANUFACTURING OPTICAL DISK

[75] Inventors: Tetsuya Inui; Akira Takahashi, both of Nara; Kenji Ohta, Kitakatsuragi-gun, all of Japan

[73] Assignee: Sharp Kabushiki Kaisha, Osaka, Japan

[21] Appl. No.: 314,194

[22] Filed: Sep. 28, 1994

Related U.S. Application Data

[62] Division of Ser. No. 58,931, May 7, 1993, Pat. No. 5,383,176.

[30] Foreign Application Priority Data

| May 15, 1992 | [JP] | Japan | 4-123429 |
| Mar. 16, 1993 | [JP] | Japan | 5-056005 |

[51] Int. Cl.⁶ ................................................ G03C 5/00
[52] U.S. Cl. .................. 430/321; 430/322; 430/325; 430/329; 205/70; 205/68; 264/106
[58] Field of Search .......................... 430/321, 323, 430/322, 325, 329; 205/70, 68; 264/106

[56] References Cited

U.S. PATENT DOCUMENTS

| 4,535,439 | 8/1985 | Satoh et al. | 369/275.3 |
| 4,894,260 | 1/1990 | Kumasaka et al. | 427/241 |
| 4,947,384 | 8/1990 | Suzuki et al. | 369/279 |
| 4,985,616 | 1/1991 | Nakamura et al. | 369/275.3 |
| 4,985,881 | 1/1991 | Saito et al. | 369/13 |
| 5,015,338 | 5/1991 | Tabuchi et al. | 204/5 |
| 5,214,635 | 5/1993 | Satoh et al. | 369/275.4 |
| 5,338,178 | 8/1994 | Kato et al. | 425/385 |

FOREIGN PATENT DOCUMENTS

| 0176755 | 4/1986 | European Pat. Off. . |
| 0193614 | 9/1986 | European Pat. Off. . |
| 0499278 | 8/1992 | European Pat. Off. . |
| 58-23333 | 2/1983 | Japan . |
| 61-61237 | 3/1986 | Japan . |
| 61-63930 | 4/1986 | Japan . |
| 1-307020 | 12/1989 | Japan . |
| 2-156423 | 6/1990 | Japan . |

Primary Examiner—Thorl Chea
Attorney, Agent, or Firm—David G. Conlin; Peter F. Corless

[57] ABSTRACT

Methods for manufacturing an optical disk having spiral or concentric grooves and land portions between the grooves are disclosed. In one aspect, the methods include projection of light spots onto a photosensitive material so that areas of the photosensitive material exposed to a first light spot form the pattern of spiral or concentric grooves and that areas of said photosensitive material which correspond to said land portions and are exposed to a second light spot form a predetermined pit pattern.

10 Claims, 8 Drawing Sheets

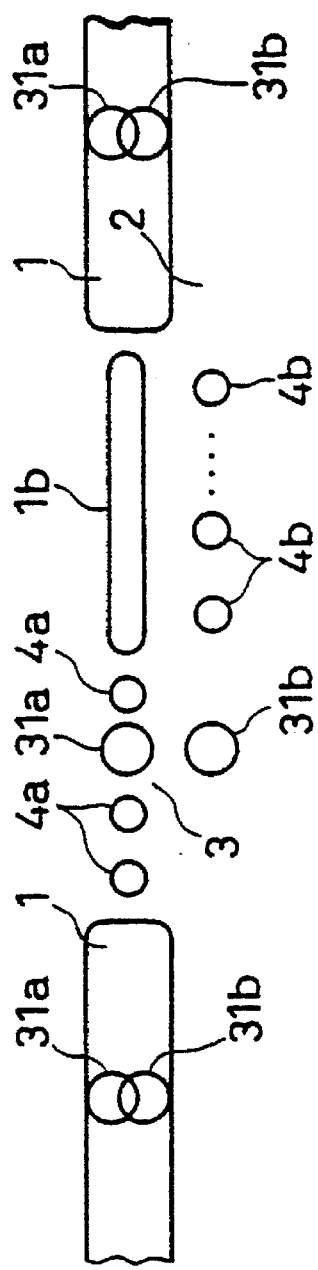
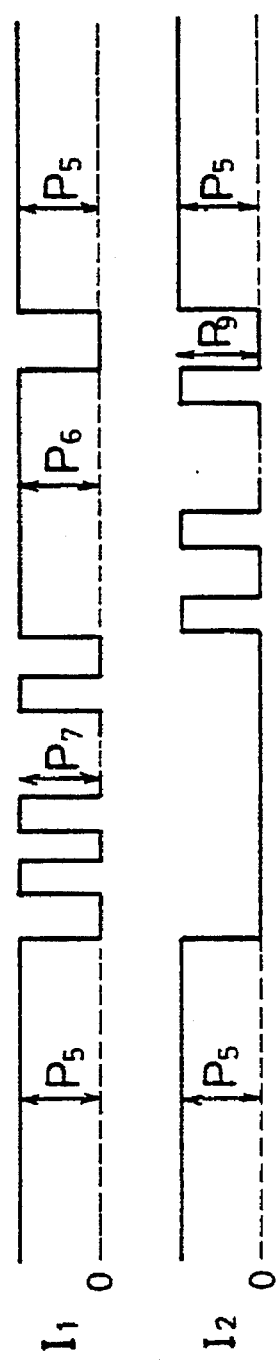
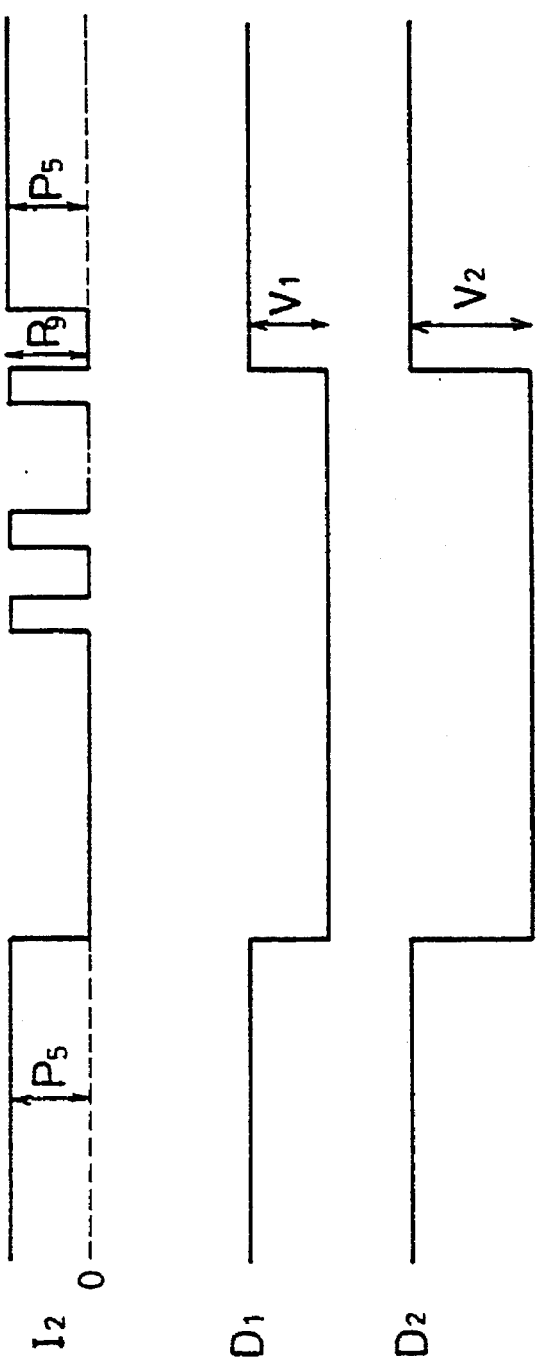
FIG.7(a)
FIG.7(b)
FIG.7(c)
FIG.7(d)
FIG.7(e)

METHOD FOR MANUFACTURING OPTICAL DISK

This is a divisional of application Ser. No. 08/058,931, filed on May 7, 1993, now U.S. Pat. No. 5,383,176.

FILED OF THE INVENTION

The present invention relates to optical disks, including magneto-optical disks, on which address information is prerecorded as a series of pits.

BACKGROUND OF THE INVENTION

Among optical memories on/from which information is recorded/reproduced using light, magneto-optical disks having a recording film made of a perpendicularly magnetized film as a recording medium have been practically used. Information is recorded on the magneto-optical disks when a direction of magnetization within light spots is arranged to be upward or downward by applying a magnetic field while irradiating laser light onto the recording film.

As illustrated in FIG. 8, a magneto-optical disk has grooves 51. A light spot 55 accurately follows a land 52 between the grooves 51. The address information of a particular track that the light spot 55 follows is obtained because address information is recorded on each of the lands 52 as pits 53.

Information is recorded on tracks as lands 52. The track pitch is almost equal to the diameter of the light spot 55 which is determined by the wavelength of laser light and the numerical aperture of an objective lens. The objective lens converges the laser light into the light spot 55. Usually, the wavelength of the laser light is between 780 nm and 830 nm and the numerical aperture of the objective lens is between 0.45 and 0.6. Thus, the light spot 55 has a diameter of between 1.2 and 1.4 µm and the track pitch is between 1.4 and 1.6 µm. Accordingly, the minimum diameter of an upwardly or downwardly magnetized recording domain 54 is around 0.8 µm.

A magneto-optical disk with flat mirrored sections 62 shown in FIG. 9 is also well known. The mirrored sections 62 do not have grooves 61 but pits 63. The light spot 55 tracks the grooves 61, and the address information of a particular track that the light spot 55 follows is obtained by reproducing the pits 63. Similar to the above-mentioned optical disk of FIG. 8, the minimum diameter of a recording domain 64 on the groove 61 of this magneto-optical disk is around 0.8 µm.

In recent years, magneto-optical disks including a recording film of a multi-layer structure have been produced so as to achieve magnetic super resolution effects. The magneto-optical disk with such a structure produces a recording domain of a size much smaller than the size of the light spot 55, achieving improved recording density. With the magnetic super resolution technique, recording domains of size almost one half of the conventional size are stably formed. It is therefore possible to reduce the track pitch to around 0.8 µm or one half of the conventional track pitch, improving the recording density significantly. For example, there is a detailed report on magnetic super resolution in "Journal of Japanese Applied Magnetism Association", Vol. 15, No. 5, 1991, pp. 838–845.

With the conventional structures, however, when the track pitch is reduced to a half, the size of the pit 53 is also reduced to a half, resulting in weaker signals from the pits 53.

Further, the distance between pits 53 formed on adjacent tracks is also decreased to a half. This causes crosstalk and prevents accurate address information from being obtained.

SUMMARY OF THE INVENTION

An object of the present invention is to provide an optical disk which has a reduced track pitch and is capable of giving accurate address information.

In order to achieve the above object, an optical disk of the present invention has concentric or spiral grooves, a first series of pits formed in interrupted portions of the grooves, and a second series of pits formed in portions of lands. Both of the first and second series of pits represent address information. The portions of the lands and the interrupted portions of the grooves are located in different radial directions of the magneto-optical disk.

With this arrangement, it is possible to obtain accurate address information even when the track pitch is reduced, thereby achieving a high-density recording optical disk.

For a fuller understanding of the nature and advantages of the invention, reference should be made to the ensuing detailed description taken in conjunction with the accompanying drawings.

BRIEF DESCRIPTION OF THE DRAWINGS

FIGS. 1 through 7 illustrate embodiments of the present invention.

FIG. 1 is a view explaining a schematic structure of a magneto-optical disk according to a first embodiment.

FIG. 2 is a view explaining a schematic structure of a magneto-optical disk according to a second embodiment.

FIG. 3 is a view explaining a schematic structure of a magneto-optical disk according to a third embodiment.

FIG. 4(a) is a view explaining a first step of the process of making a master.

FIG. 4(b) is a view explaining a second step of the process of making a master.

FIG. 4(c) is a view explaining a third step of the process of making a master.

FIG. 4(d) is a view explaining a fourth step of the process of making a master.

FIG. 4(e) is a view explaining a fifth step of the process of making a master.

FIG. 4(f) is a view explaining a sixth step of the process of making a master.

FIG. 5 is a block diagram schematically illustrating a recording device used for the exposure of a photoresist during the process shown in FIGS. 4(a)–(f).

FIG. 6(a) is a view explaining a schematic structure of a substrate of a magneto-optical disk.

FIG. 6(b) is a view explaining the intensity of a light spot.

FIG. 6(c) is a view explaining the intensity of a light spot.

FIGS. 7(a)–(e) are views explaining another exposure method of the photoresist employed by the recording device of FIG. 5.

FIG. 7(a) is a view explaining a schematic structure of a substrate of a magneto-optical disk.

FIG. 7(b) is a view explaining the intensity of a light spot.

FIG. 7(c) is a view explaining the intensity of a light spot.

FIG. 7(d) is a view explaining a voltage to be applied to a light deflector.

FIG. 7(e) is a view explaining a voltage to be applied to a light deflector.

DESCRIPTION OF THE EMBODIMENTS

Figure 1:
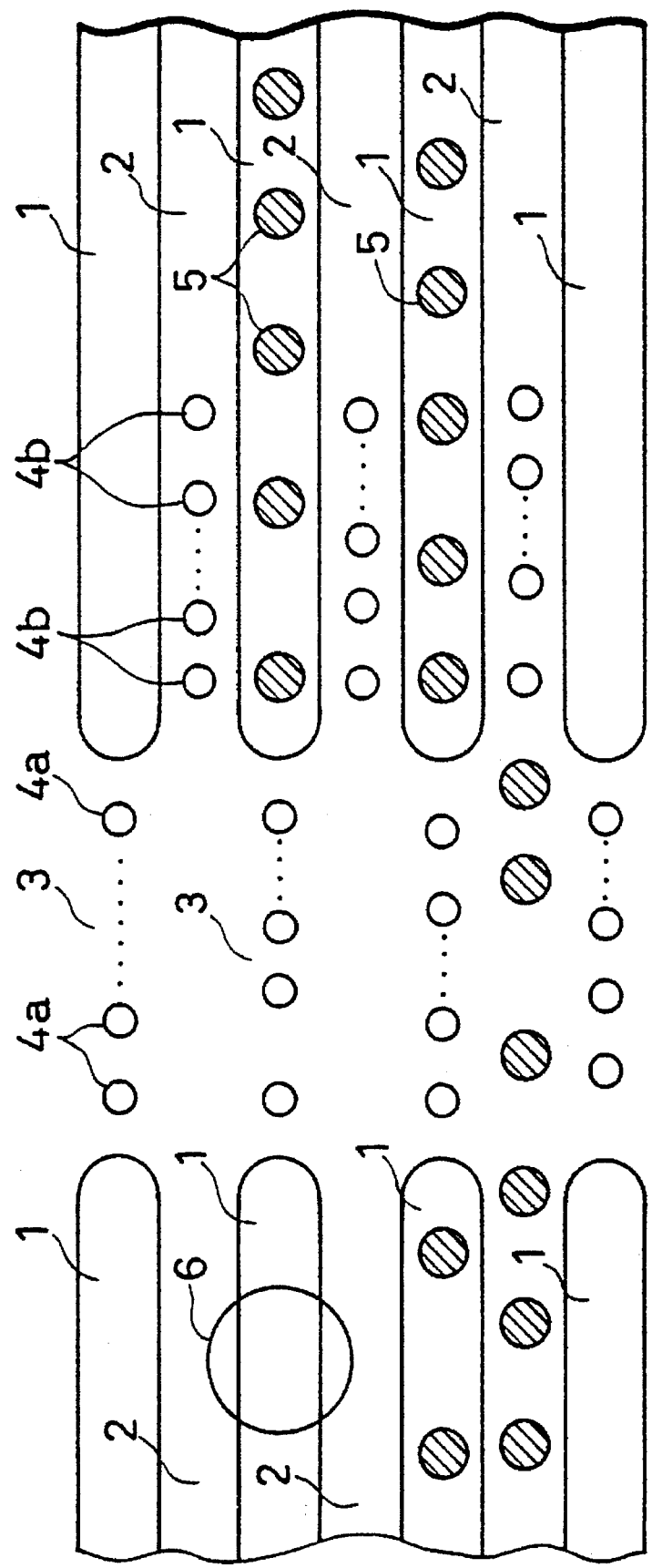

The following description discusses a first embodiment of the present invention with reference to FIG. 1.

As illustrated in FIG. 1, a magneto-optical disk of this embodiment is provided with concentric or spiral grooves 1 having an interrupted portion in each rotation. The interrupted portion forms a flat mirrored section 3. The width of each groove 1, the width of a land 2 between the grooves 1, and the track pitch are all equal.

The mirrored sections 3 have therein address information recorded in the form of pits 4a (a first series of pits), while portions of the lands 2 near the mirrored sections 3 have therein address information recorded in the form of pits 4b (a second series of pits). Namely, the pits 4a and pits 4b are formed in different radial directions of the magneto-optical disk.

With this arrangement, information is recorded on the grooved tracks 1 and tracks formed by lands 2. Whether light spot 6 is controlled to follow the grooved tracks 1 or the land tracks 2 is easily selected by reversing the polarity of tracking signals. For example, the tracking signals are generated by a push-pull method.

When the light spot 6 scans the grooved tracks 1, the address information is retrieved from the pits 4a. On the other hand, when the light spot 6 scans the land tracks 2, the address information is retrieved from the pits 4b.

As described above, in the magneto-optical disk of this embodiment, the pits 4a and pits 4b are formed in different radial directions so that they are not located next to each other. Thus, the light spot 6 is never projected on the pit 4a and pit 4b at the same time. This arrangement restricts crosstalk, thereby providing accurate address information.

With the use of the magnetic super resolution effects, it is possible to make the diameter of a recording domain 5 around 0.4 µm when recording information. When the width of the track is 0.8 µm (i.e., the widths of the groove 1 and the land 2 are also set to 0.8 µm, respectively), recording and reproduction are easily performed. By reducing the track pitch to a half of the conventional pitch of 1.6 µm, i.e., to 0.8 µm, the recording density is significantly improved while providing accurate address information.

Meanwhile, when laser light with a shorter wavelength is used for the recording and reproduction of information, it is possible to further reduce the track pitch. For instance, when laser light with a wavelength of 458 nm is used instead of the laser light with a wavelength of 830 mm, a track pitch, given by multiplying 0.8 µm by 458/830, is obtained, achieving almost doubled recording density.

According to this embodiment, in the case where the magneto-optical disk is divided into a plurality of sectors and the memory area thereof is managed by tracks and sectors, mirror sections 3 of a number equal to the number of sectors are needed to be formed in each rotation of the groove 1, and pits 4a and 4b are needed to be formed in each mirror section 3.

On the other hand, if the memory area of the magneto-optical disk is managed by a plurality of tracks, only one mirror section 3 is formed every n (n>1) rotation of the groove 1, and the pits 4a and 4b are formed in each mirror section 3.

It is also possible to divide the magneto-optical disk into a plurality of ring-shaped zones and to vary the number of sectors per track in each zone.

The pits 4a are arranged either in the same radial direction or different radial directions. The same is said for the pits 4b.

In order to obtain accurate address information or tracking signals, it is not desirable to arrange the pits 4b or the groove 1 adjacent to the inner edges (facing the center of the magneto-optical disk) of the pits 4a or the outer edges (facing the periphery of the magneto-optical disk) thereof.

One of the reasons for this is that such an arrangement causes a cross talk in address signals. Another reason is that, if the light spot 6 scans the pit 4b when scanning a track on the land 2, the polarity of the tracking signal is inverted, causing instable tracking.

Figure 2:
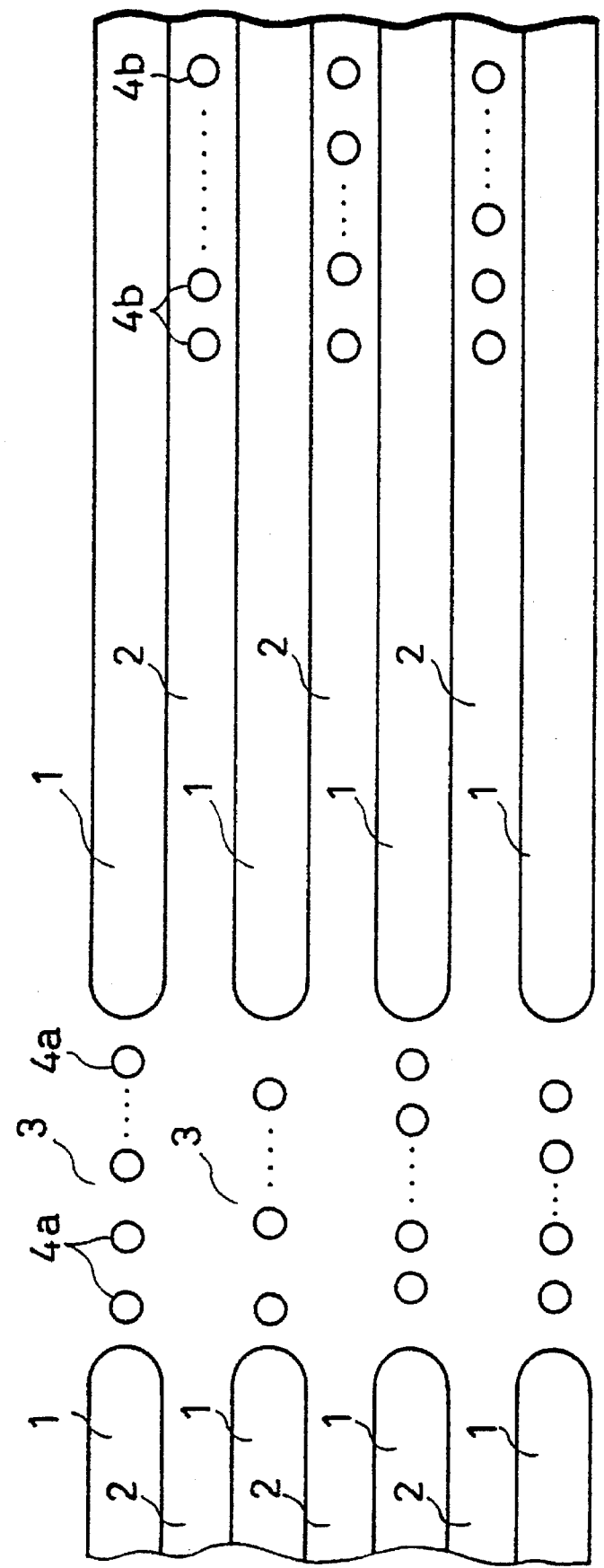

The following description discusses a second embodiment of the present invention with reference to FIG. 2. The members having the same structure (function) as in the first embodiment are designated by the same code and their description is omitted.

A significant difference between the magneto-optical disk of the first embodiment and a magneto-optical disk of this embodiment is that address information as pits 4b is recorded in portions of lands 2 far from the mirrored sections 3 in this embodiment.

This arrangement further restricts crosstalk between the pits 4a and pits 4b, thereby providing more accurate address information.

Figure 3:
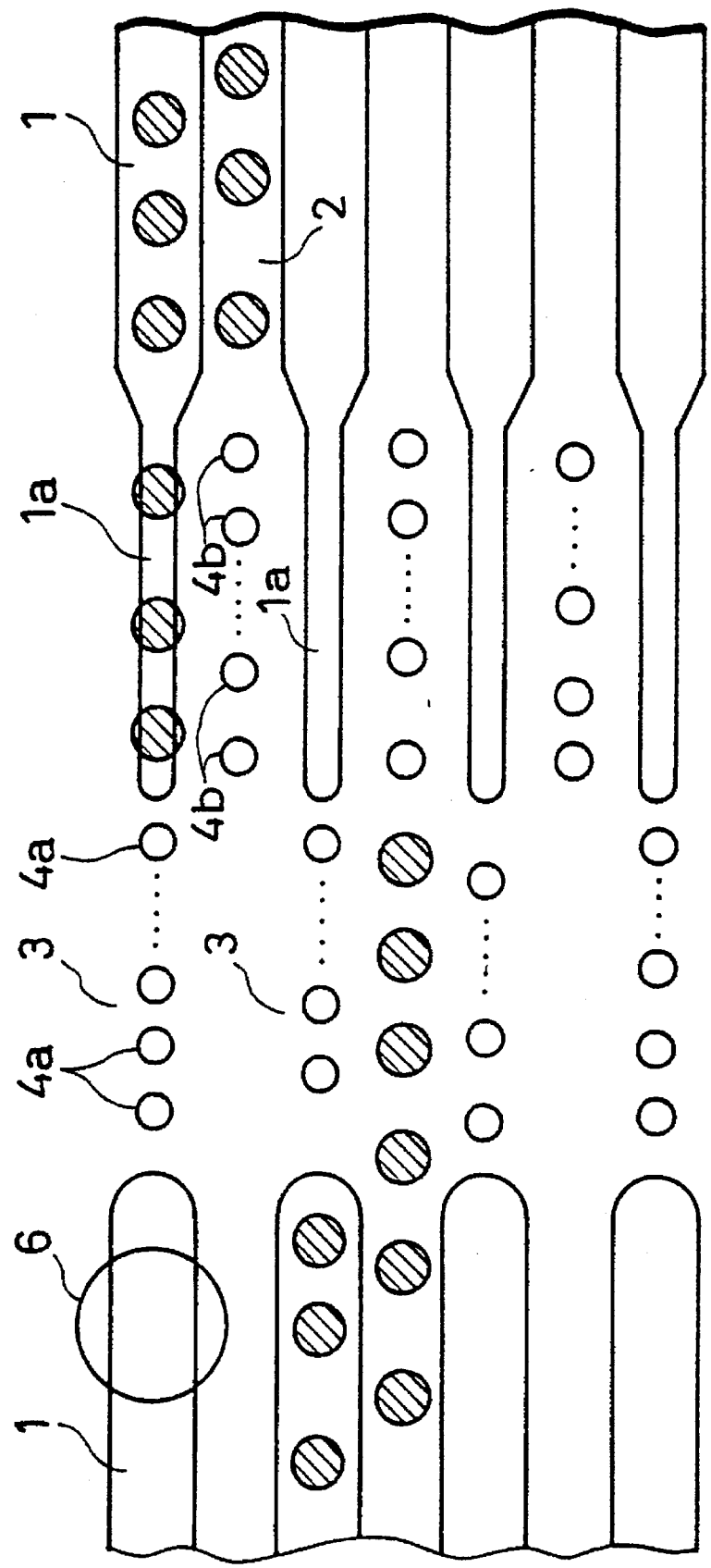

The following description discusses a third embodiment of the present invention with reference to FIG. 3. The members having the same structure (function) as in the above-mentioned embodiments are designated by the same code and their description is omitted.

Differently from the magneto-optical disks of the first and second embodiments, grooved portions 1a adjacent to the pits 4b have a reduced width compared to that of the grooves 1 in a magneto-optical disk of this embodiment. Additionally, in this embodiment, the grooved portion 1a is not necessarily connected to the groove 1.

When the widths of the groove 1 and land 2 are 0.8 µm, respectively, the grooved portion 1a has a width between 0.4 and 0.5 µm.

As a result, the difference in the amount of reflected light between light reflected from a portion of the land 2 having the pits 4b and light reflected from a portion of the land 2 having no pit 4b becomes greater than those in the above-mentioned embodiments. It is therefore possible to obtain more accurate address information from the pits 4b.

When seeking an improvement of the quality of signals from the pits 4b, the width of the grooved portion 1a is preferably reduced to, for example, 0.3 to 0.4 µm. On the other hand, when seeking an improvement of the signal quality of magneto-optical signals from recording domains recorded on the grooves 1, the grooved portion 1a preferably has a greater width of, for example, 0.4 to 0.6 µm. Namely, when the grooved portion 1a has a width between 0.4 and 0.5 µm, both signals from the pits 4b and from the recording domains have satisfactory signal quality.

In the first to third embodiments, the width of the groove 1 is equal to the width of the land 2. Therefore, when the track of the groove 1 and the track of the land 2 are scanned with the light spot 6, the amount of the reflected light from the groove 1 is equal to that of the reflected light from the land 2. Namely, the strength of the signals obtained by scanning these tracks are substantially the same.

Consequently, the processing circuit for the reproduced signal is simplified.

In order to obtain a strong track cross signal, the width of the of the groove 1 and the width of the land 2 may be arranged different from each other to some degree. The track cross signal represents a change in the amount of reflected light of the light spot 6 when it crosses the track. A tracking error signal represents a deviation of the light spot 6 from the center of the track 1. To access a target track, the moving direction of the light spot 6 is detected based on a difference in phase between the track cross signal and the tracking error signal.

Although the strong track cross signal is obtained when the difference between the width of the groove 1 and that of the land 2 is great, the quality of the reproduced signal deteriorates.

For example, in the case where the sum of the width of the groove 1 and the width of the land 2 is 1.6 µm (or the track pitch is 0.8 µm), the wavelength of the laser light is 780 nm and the numerical aperture of the objective lens is 0.55, if the width of the groove 1 or the land 2 is less than 0.4 µm, the difference between the reflectance at the track of the groove 1 and that at the track of the land 2 becomes greater. Namely, the amount of reflected light from the track of a narrower width significantly decreases.

On the other hand, if the width of the groove 1 or the land 2 is between 0.7 and 0.8 µm, a strong track cross signal is not obtained. In order to obtain appropriate reproduced signals and track cross signals, it is desirable to arrange the width of the groove 1 or the land 2 within the range of 0.4 to 0.7 µm.

In general, when the width of the groove 1 or the land 2 is not greater than about 30 percent of the diameter of the light spot 6 (780 nm/0.55×0.3=0.42 µm according to the above-mentioned example), the difference between the reflectance at the track of the groove 1 and that at the track of the land 2 becomes greater. Also, when the width of the groove 1 or the land 2 exceeds about 45 percent of the sum of width of the groove 1 and the width of the land 2 or the twice the track pitch (1.6 µm×0.45=0.72 µm according to the above-mentioned example), the track cross signal is significantly weakened.

Thus, to obtain appropriate reproduced signals and track cross signals, it is desirable to arrange the width of the groove 1 and of the land 2 not to be less than 30 percent of the diameter of the light spot 6 and not to be greater than 45 percent of the twice the track pitch.

With reference to FIG. 4, the following description discusses a process of making a master of each of the three types of magneto-optical disks described in the first through third embodiments.

Figure 4A:
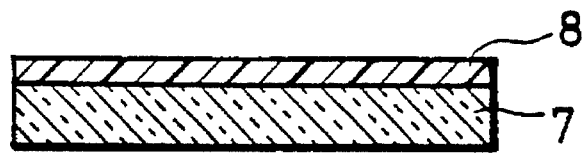
FIGS. 4(a)–(f) are views explaining a process of making a master of substrates for the magneto-optical disks shown in FIGS. 1 through 3.
Figure 4B:
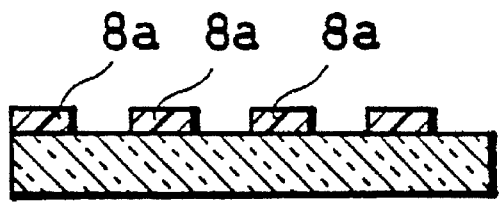

Firstly, a photoresist 8 is applied to a surface of a quarts substrate 7 as shown in FIG. 4(a). Secondly, laser light is converged on the photoresist 8 so as to create desired patterns of grooves 1, pits 4a and 4b on the surface thereof. After developing the photoresist 8, unwanted portions of the photoresist 8 are removed so that a photoresist 8a corresponding to the desired patterns of the grooves 1, pits 4a and 4b remains on the substrate 7 as shown in FIG. 4(b).

Figure 4C:
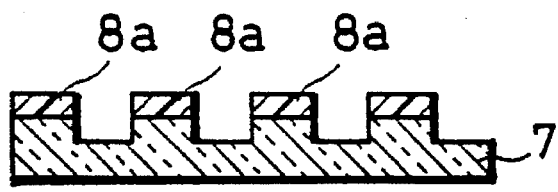
Figure 4D:
Figure 4E:
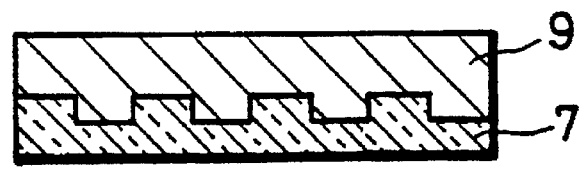
Figure 4F:

The photoresist 8a serves as a mask when dry-etching the substrate 7 (see FIG. 4c). For example, $CF_4$ is used as etching gas. After etching, the photoresist 8a is removed as shown in FIG. 4(d) and a metal layer 9 made of Ni is electroformed as shown in FIG. 4(e). Then, the metal layer 9 is separated to obtain a stamper as shown in FIG. 4(f).

By molding plastic such as polycarbonate with the stamper, a substrate with the desired patterns of the grooves 1, pits 4a and 4b is obtained. When a recording medium is formed on the substrate, the magneto-optical disk is obtained.

Figure 5:
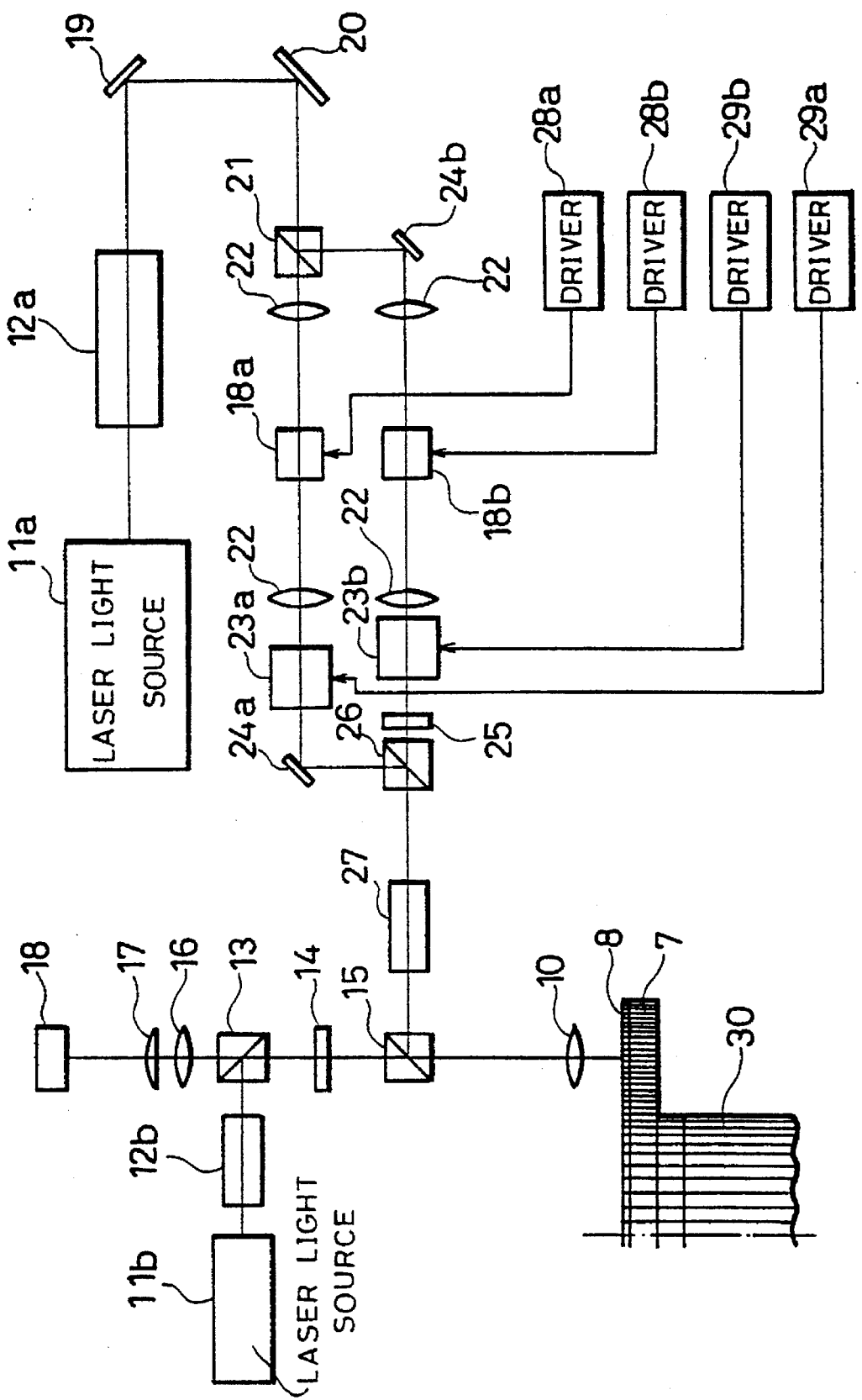

FIG. 5 shows one example of a recording device used in an exposure process for creating the desired patterns of the grooves 1, pits 4a and 4b with the photoresist 8.

The recording device has a laser light source 11a for the exposure of the photoresist 8, and a laser light source 11b for focusing an objective lens 10. For example, argon laser is used as the laser light source 11a and He-Ne laser is used as the laser light source 11b.

Laser light from the laser light source 11a passes through a noise suppressor 12 for reducing optical noise, is reflected by mirrors 19 and 20, and then falls upon a beam splitter 21. The beam splitter 21 splits the laser light into two beams of light. One of the beams of light falls upon a light modulator 18a, and the other falls upon a light modulator 18b after being reflected by a mirror 24b. For example, acoustic optical elements are used as the light modulators 18a and 18b. In this case, there is a need to place a convex lens 22 for convergence in front of and behind each light modulator 18a or 18b.

The light beam from the light modulator 18a falls upon a light deflector 23a and is then reflected at a right angle by the mirror 24a. And, the light beam from the light modulator 18b falls upon a light deflector 23b and then upon a half-wave plate 25, so that a plane of polarization is turned by 90 degrees. For example, elements capable of changing the travelling direction of the light with the use of electro-optical effects or acoustic optical effects are used as the light deflectors 23a and 23b.

These light beams are joined by a polarizing prism 26 and then expanded to have an appropriate beam diameter by a beam expander 27. After the beams have been expanded, the beams are reflected by a bicolor mirror 15 and fall upon the objective lens 10. The objective lens 10 converges the beams into light spots 31a and 31b, to be described later, on the photoresist 8 on the substrate 7.

The light modulators 18a and 18b are controlled by drivers 28a and 28b, respectively, while the light deflectors 23a and 23b are controlled by drivers 29a and 29b, respectively.

Meanwhile, the laser light from the laser light source 11b passes through a noise suppressor 12b for reducing optical noise, a beam splitter 13, a quarter-wave plate 14, a bicolor mirror 15, and is then converged on the photoresist 8 on the substrate 7 by the objective lens 10.

The reflected light is converged by the objective lens 10, passes through the bicolor mirror 15, the quarter-wave plate 14, and the beam splitter 13. The light is then converged on a four-quadrant photodetector 18 by an objective lens 16 and a cylindrical lens 17. Based on signals from the photodetector 18, focus servo signals are generated so that a focus servo system (not shown) drives the objective lens 10 in a focussing direction. The objective lens 10 is thus always focused when the photoresist 8 on the substrate 7 is rotated by a spindle motor 30.

The following description discusses how the photoresist 8 is exposed in the recording device with reference to FIG. 6.

Figure 6A:
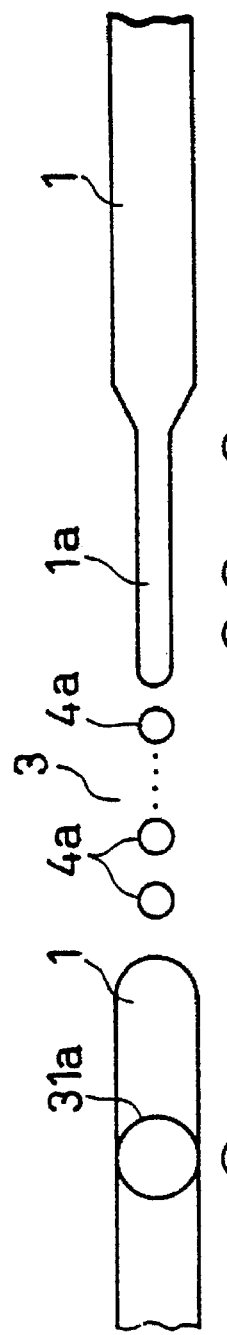
FIGS. 6(a)–(c) are views explaining an exposure method of the photoresist employed by the recording device of FIG. 5.

Firstly, a d.c. voltage to be applied to the light deflectors 23a and 23b by the drivers 29a and 29b and the setting angles of the mirrors 24a and 24b are adjusted so as to focus the light spots 31a and 31b at a distance equal to the track pitch onto a line extending in a radial direction of the magneto-optical disk as shown in FIG. 6(a).

Figure 6B:
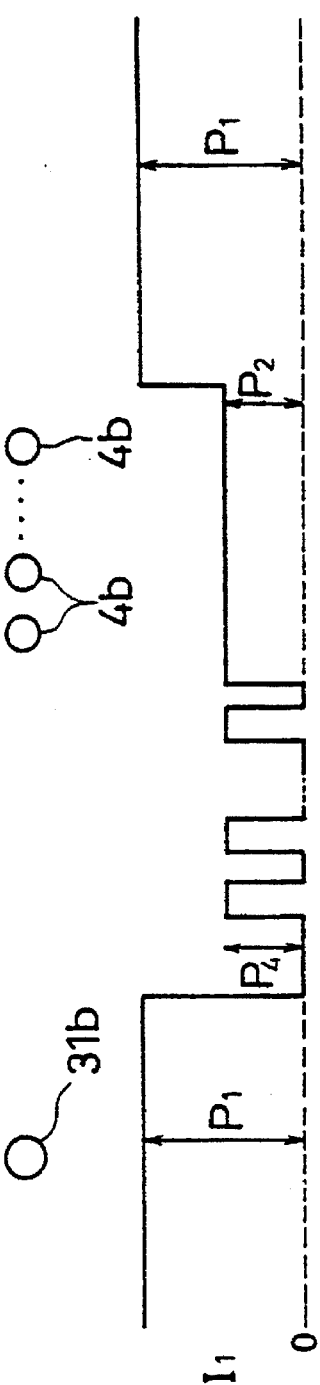

Then, the light intensity $I_1$ of the light spot 31a is controlled as shown in FIG. 6(b) by the driver 28a so that the light spot 31a is irradiated on the photoresist 8 to create the groove 1, pits 4a, grooved portion 1a and groove 1 in this order from the left as shown in FIG. 6(a).

More specifically, when the photoresist 8 is exposed to have the pattern of the grooves 1, the light intensity $I_1$ is set to high level $P_1$. Similarly, when the photoresist 8 is exposed to have the pattern of pits 4a, the light intensity $I_1$ is set to low level $P_4$. And when the photoresist 8 is exposed to have the pattern of the grooved portions 1a, the light intensity $I_1$ is set to the low level $P_2$. On the other hand, when the exposure of the photoresist 8 is not required, the light intensity $I_1$ is set to zero. Thus, the size of the exposed area of the photoresist 8 is controlled by varying the light intensity $I_1$.

Figure 6C:
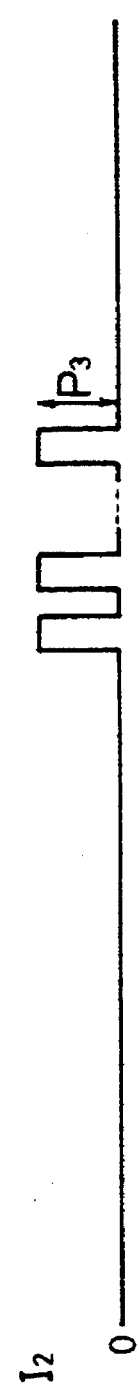
Figure 8:
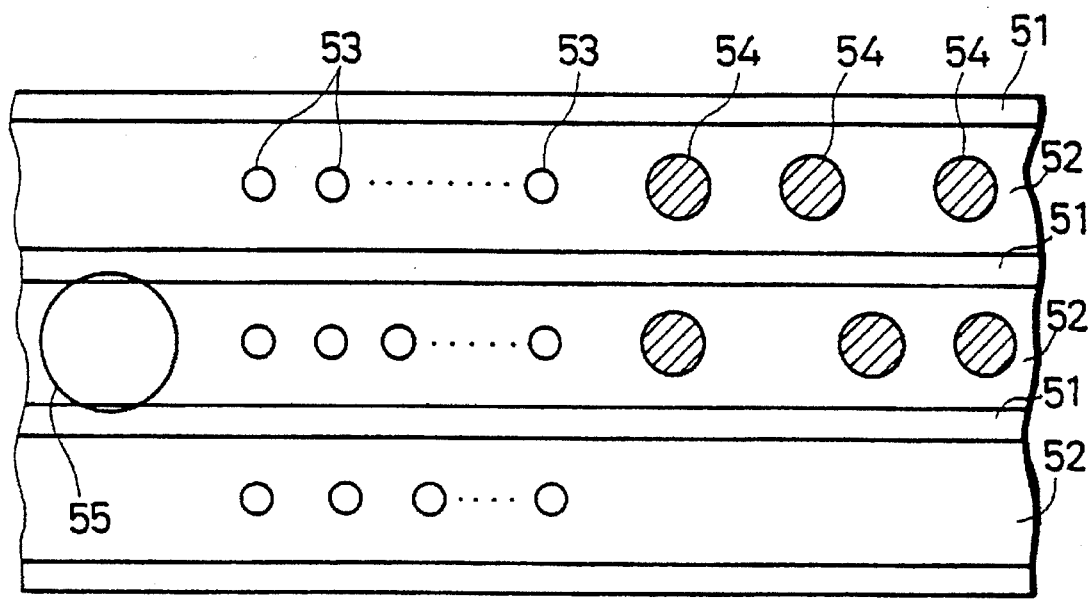
FIG. 8 is a view explaining a schematic structure of a conventional magneto-optical disk.
Figure 9:
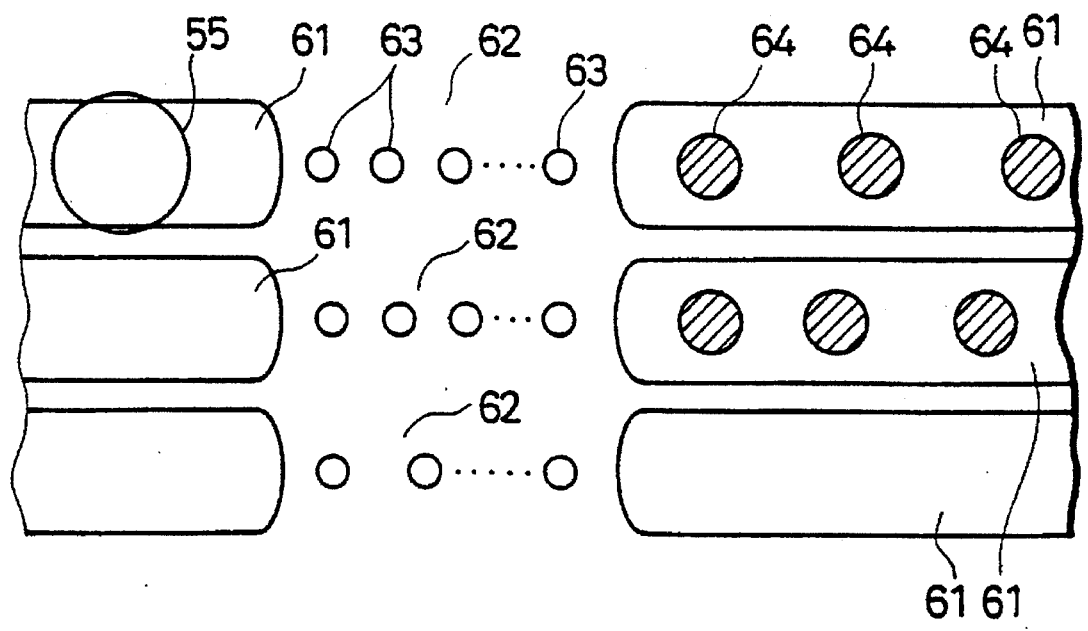
FIG. 9 is a view explaining a schematic structure of another conventional magneto-optical disk.

When the photoresist 8 is exposed to create the pattern of pits 4b parallel to the grooves 1a as shown in FIG. 6(a), the light intensity $I_2$ of the light spot 31b is controlled by the driver 28b as shown in FIG. 6(c).

More specifically, when the photoresist 8 is exposed to create the pattern of pits 4b, the light intensity $I_2$ is set to low level $P_3$. On the other hand, when the exposure of the photoresist 8 is not needed, the light intensity $I_2$ is set to zero.

Another exposure method employed by the recording device is explained below with reference to FIG. 7.

A difference between the method of the above-mentioned embodiment and that of this embodiment is that the grooves 1 are formed by two light spots 31a and 31b with the method of this embodiment.

In order to project the light spots 31a and 31b at a distance equal to a half of the track pitch onto a line extending in a radial direction of the magneto-optical disk as illustrated in FIG. 7(a), the d.c. voltage to be applied to the light deflectors 23a and 23b by the drivers 29a and 29b and the setting angle of the mirrors 24a and 24b are adjusted.

Then, in order to create a half portion (upper half in the drawing) of the groove 1, the pits 4a, the grooved portion 1b and the half portion of the groove 1 in this order from the left, the light spot 31a is projected onto the photoresist 8 while controlling the intensity $I_1$ thereof as shown in FIG. 7(b) by the driver 28a.

Namely, when the photoresist 8 is exposed to create the pattern of the half portion of the grooves 1, the light intensity $I_1$ is set to level $P_5$. When the photoresist 8 is exposed to create the pattern of the pits 4a, the light intensity $I_1$ is set to level $P_7$. When the photoresist 8 is exposed to create the pattern of the grooved portion 1b, the light intensity $I_1$ is set to level $P_6$. And, when the exposure of the photoresist 8 is not required, the light intensity $I_1$ is set to zero. Thus, by varying the light intensity $I_1$, the size of the exposed area of the photoresist 8 is controlled.

Meanwhile, when the photoresist 8 is exposed to create the patterns of the pits 4a and the grooved portions 1b, the voltage to be applied to the light deflector 23a by the driver 29a is shifted by $V_1$ and the light spot 31a is centralized on the groove 1 in a cross direction.

On the other hand, in order to create a half portion (lower half in the drawing) of the groove 1, and pits 4b parallel to the grooved portion 1b as shown in FIG. 7(a), the light spot 31b is projected onto the photoresist 8 while controlling the intensity $I_2$ thereof by the driver 28b as shown in FIG. 7(c).

More specifically, when the photoresist 8 is exposed to create the pattern of the half portion of the grooves i, the light intensity $I_1$ is set to level $P_5$. When the photoresist 8 is exposed to create the pattern of the pits 4b, the light intensity $I_2$ is set to level $P_9$. And, when the exposure of the photoresist 8 is not required, the light intensity $I_1$ is set to zero.

When the photoresist 8 is exposed to create the patterns of the pits 4b and the grooved portions 1a, a voltage to be applied to the light deflector 23b by the driver 29b is shifted by $V_2$ as shown in FIG. 7(e) and the light spot 31b is centralized on the land 2 in a cross direction.

With this method, when the width of the grooved portion 1b and the diameters of the pits 4a and 4b are respectively equal to a half of the width of the groove 1, it is possible to set $P_5$, $P_6$, $P_7$ and $P_9$ to have the same value, the light intensities $I_1$ and $I_2$ of the light spots 31a and 31b are easily set to two levels. As a result, the control of the light spots 31a and 31b becomes easier compared to those by the above-mentioned methods.

The above description discusses the exposure process of the photoresist 8 in the recording device by using, for example, the magneto-optical disk of the third embodiment. However, this process is also applied to the magneto-optical disks of the first and second embodiments.

Magneto-optical disks and the method of manufacturing the magneto-optical disks are explained in the above-mentioned embodiments. This invention is also applicable to a wide range of optical disks having address information in the form of pits 4a and 4b and to methods of manufacturing these disks.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of manufacturing an optical disk comprising the steps of:

depositing a photosensitive material on a substrate;

forming a predetermined pattern by projecting a light spot onto said photosensitive material;

producing a master disk using said pattern; and manufacturing an optical disk from said master disk, said optical disk having spiral or concentric grooves and land portions between the grooves, wherein in the step of forming said pattern, two light spots are projected onto said photosensitive material so that areas of said photosensitive material exposed to a first light spot form the pattern of spiral or concentric grooves and that areas of said photosensitive material which correspond to said land portions and are exposed to a second light spot form a predetermined pit pattern, wherein said grooves have interrupted portions, a first series of pits recorded as address information in said interrupted portion, and a second series of pits recorded as address information in a portion of land, the portion of said land and the interrupted portion of said groove being located in different radial directions, and further wherein in the step of forming the pattern, exposing of said photosensitive material to the first light spot for forming the pattern of said grooves and exposing of said photosensitive material for forming said first series of pits are successively performed, and areas of said photosensitive material corresponding to said lands are exposed to the second light spot to form the pattern of said second series of pits.

2. The method for manufacturing an optical disk according to claim 1,
wherein an intensity of said first light spot when exposing said photosensitive material to form the pattern of said first series of pits is lower than an intensity thereof when exposing said photosensitive material to form the pattern of said grooves.

3. The method for manufacturing an optical disk according to claim 1,
wherein said photosensitive material is exposed to form a pattern of a smaller width of said groove using the first light spot for exposing said photosensitive material to form the pattern of said grooves.

4. The method for manufacturing an optical disk according to claim 3,
wherein an intensity of said first light spot when exposing said photosensitive material to form the pattern of the smaller width of the groove is lower than an intensity of said first light spot when exposing said photosensitive material to form the pattern of said grooves.

5. The method for manufacturing an optical disk according to claim 1,
wherein an intensity of said first light spot when exposing said photosensitive material to form a pattern of grooves adjacent to said second series of pits is weaker than an intensity of said first light spot used just before the formation of the pattern of the grooves.

6. The method for manufacturing an optical disk according to claim 5,
wherein said photosensitive material is exposed to form said first series of pits in the interrupted portion of the groove by moving one of said light spots on a center line of the groove, and said photosensitive material is exposed to form the pattern of said second series of pits by moving the other light spot on a center line of the land.

7. The method for manufacturing an optical disk according to claim 6,
wherein the intensity of said light spot is controlled to be an exposing level and a non-exposing level.

8. The method for manufacturing an optical disk according to claim 1,
wherein the step of depositing the photosensitive material on the substrate is carried out by applying a photoresist on a glass substrate, and
wherein the step of producing the master disk using said pattern includes developing an exposed photoresist, etching said glass substrate by using a remaining photoresist after development as a mask, forming a metal layer on the etched surface of said glass substrate, and removing said metal layer from said glass substrate to produce the master disk.

9. The method of claim 1 wherein the light spots are simultaneously projected onto the photosensitive material.

10. The method of claim 9 wherein the light spots are generated by split beams of light are simultaneously projected to perform exposure.

* * * * *